(12) United States Patent
Zhang et al.

(10) Patent No.: US 7,174,009 B1
(45) Date of Patent: Feb. 6, 2007

(54) ELIMINATION OF INOPERABLE SERVICE NODE DURING CALL SET UP

(75) Inventors: Baoquan Zhang, Overland Park, KS (US); Karen H. Miller, Overland Park, KS (US); Von K. McConnell, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 71 days.

(21) Appl. No.: 10/873,587

(22) Filed: Jun. 21, 2004

(51) Int. Cl.
*H04M 7/00* (2006.01)

(52) U.S. Cl. .................... 379/221.01; 379/220.01; 379/221.08; 379/221.09

(58) Field of Classification Search .......... 379/207.02, 379/207.04, 207.12, 211.01, 211.02, 221.01, 379/221.03, 221.08, 220.01
See application file for complete search history.

(56) References Cited

U.S. PATENT DOCUMENTS

| | | | | |
|---|---|---|---|---|
| 4,284,852 A | * | 8/1981 | Szybicki et al. | 379/221.01 |
| 4,991,204 A | * | 2/1991 | Yamamoto et al. | 379/221.01 |
| 5,142,570 A | * | 8/1992 | Chaudhary et al. | 379/221.07 |
| 5,832,061 A | * | 11/1998 | Rubin | 379/88.1 |
| 5,978,730 A | * | 11/1999 | Poppen et al. | 701/202 |
| 5,982,870 A | * | 11/1999 | Pershan et al. | 379/221.08 |
| 6,047,055 A | * | 4/2000 | Carkner et al. | 379/221.13 |
| 6,332,022 B1 | * | 12/2001 | Martinez | 379/220.01 |
| 6,606,668 B1 | * | 8/2003 | MeLampy et al. | 709/241 |
| 6,694,004 B1 | * | 2/2004 | Knoerle et al. | 379/211.01 |
| 6,717,919 B1 | | 4/2004 | Ketcham et al. | 370/255 |
| 6,728,783 B1 | | 4/2004 | Scott et al. | 709/243 |
| 6,816,584 B1 | * | 11/2004 | Armstrong et al. | 379/221.01 |

* cited by examiner

*Primary Examiner*—Bing Q. Bui

(57) ABSTRACT

In a service control point (SCP) having logic normally dictating that a call destined to a called party should be routed instead to a service node for handling, a method includes making a determination that the service node has become unavailable. The method thereafter includes receiving, into the SCP, a signal from a switch, the signal indicating that the switch has received a request to set up a call to the called party. In view of the determination that the service node has become unavailable, the method then includes the SCP instructing the switch to treat the first call in a manner other than routing the call to the service node.

21 Claims, 3 Drawing Sheets

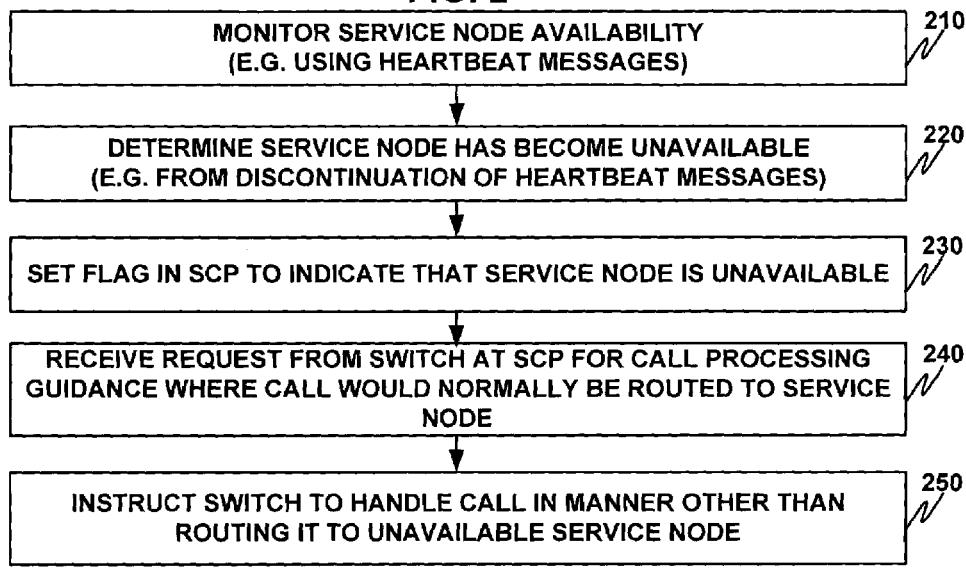
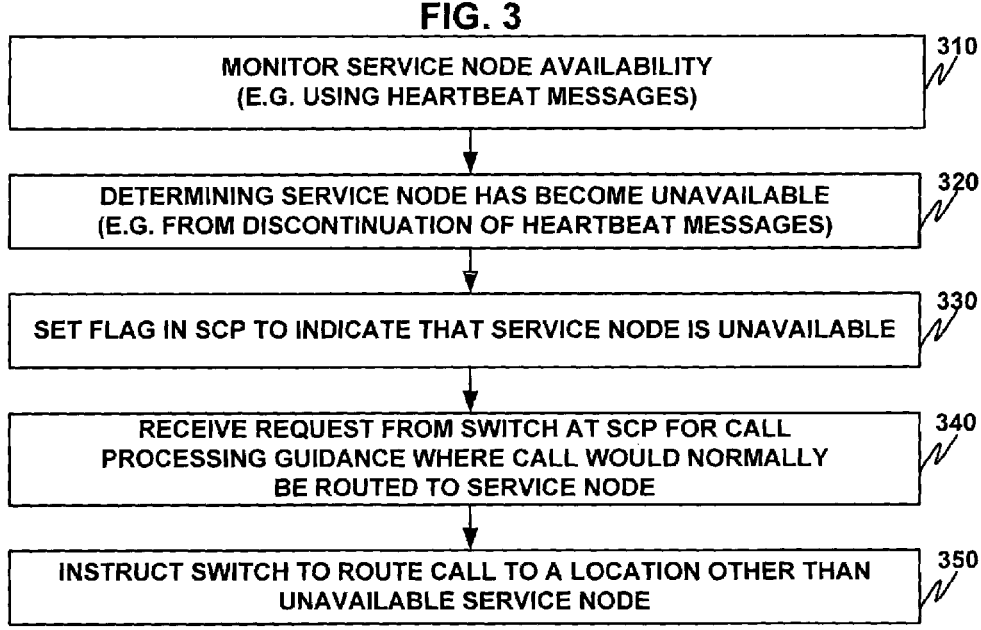

ELIMINATION OF INOPERABLE SERVICE NODE DURING CALL SET UP

BACKGROUND

I. Field of the Invention

This invention is directed to the field of telecommunications. More specifically, this invention is directed to eliminating an inoperable service node from a telephone call setup path.

II. Description of Related Art

Generally speaking, when a telecommunications switch that serves a given telephone number receives a call setup message seeking to establish a call with that number, the switch may pause call processing and signal to a service control point (SCP) to receive call processing guidance from the SCP such as in a telecommunications system implementing intelligent network functions. One such intelligent network is described in U.S. Pat. No. 6,728,783 to Scott et al., which is incorporated by reference herein. In providing the processing guidance, the SCP may refer to a service profile record for the called party, determine an action to take, and instruct the switch to handle the call accordingly. Intelligent networks may be implemented in any number of different communication systems, such as wireless communication networks (e.g., code-division-multiple access networks or global system for mobile communications), public switched telephone networks, or voice-over Internet Protocol networks. In such networks, an SCP is an entity that provides call processing guidance to other entities in the network (e.g., a communications switch).

Depending on the service profile record and/or for other reasons, the SCP might determine that the call destined to a given telephone number should be connected to a service node or other call-handling platform prior to connecting the call to the called telephone number and instruct the switch accordingly. In turn, the service node may carry out one or more functions (such as interacting with the calling party and/or executing call processing service logic) and then set up an outbound call connection to the originally called telephone number. Consequently, in this situation, the service node sits within the call path (e.g., voice path or trunk connection) from the calling party to the called party. Specifically, the voice path of the call would pass from the calling party to the service node and then from the service node to the called party. It will be appreciated, of course, that additional intermediate entities could sit within the call path as well.

An example of this scenario occurs commonly with prepaid telephone service. In particular, when a calling party seeks to place a call to a prepaid telephone subscriber, an SCP instructs the terminating switch to connect the call to a service node that is employed to monitor prepaid calling account balances. The service node then checks the account balance of the called party and, if it is sufficient, connects the call through to the called party. As the call progresses, the service node sits in the path of the call and may interject announcements (e.g., that the subscribers prepaid time is about to expire) or disconnect the call if the prepaid subscriber's balance becomes exhausted during the course of the call.

Another example of this scenario can occur in connection with a custom ring-back tone service. For this service, an SCP may also direct the terminating switch to connect a call to a service node. The service node then answers the call and plays a custom ring-back tone (such as music or a recorded voice message) to the calling party, while simultaneously placing an outbound call to the called party. When the called party answers, the service node bridges the calling and called parties together. With this service, the calling party hears music, the called party's voice, or any number of other possible custom ring-back tones, instead of a more conventional ring-back tone while waiting for the called party to answer.

In these and/or other scenarios, a problem may occur if the service node becomes unavailable, such as if the service node loses power or otherwise becomes inoperable and unable to handle calls. When such a situation occurs, the SCP would not know that the service node has become unavailable. Thus, the SCP will still direct the switch to connect calls to the unavailable service node (when such call routing would normally be appropriate). The switch would thus try to set up the call to the service node and would either (i) fail, in which case the calling party would receive a busy signal or dead air, or (ii) succeed, after which the service node would fail to set up the call to the called party, so the calling party would similarly receive a busy signal or dead air. In either case, due to the unavailability of the service node, the called party would never receive the call.

SUMMARY

The present invention provides a solution to the problem of calls being routed to unavailable or inoperative service nodes and, consequently, not being received. According to embodiments of the invention, the SCP will determine that the service node has become unavailable and will responsively avoid instructing an associated telecommunications switch to route calls to the unavailable service node.

Various mechanisms could be applied to let the SCP determine that a service node has become unavailable. One such mechanism is to have the service node provide regular heartbeat (keep-alive) messages to the SCP, so that the SCP can determine that the service node has become unavailable when those heartbeat messages stop. The heartbeat messages could be provided using a push technique (where the service node autonomously sends periodic heartbeat messages to the SCP) or a pull technique (where the SCP periodically queries the service node and treats a response from the service node as a heartbeat message). Telcordia's Generic Data Interface (GDI) could be used to convey these heartbeat messages via an Internet Protocol connection between the SCP and the service node, such is described in Telcordia Specification SR-3389, entitled ISCP Generic Data Interface Specification for TCP/IP (Using GR-246-CORE ANSI TCAP Encoding), published December 2003 or Telcordia Specification SR-5202, entitled ISCP Generic Data Interface Specification for TCP/IP (Using ITU-T Recommendation Q.773 TCAP Encoding), published December 2003, for example. The SR-3389 and SR-5202 specifications are available from Telcordia Technologies, Inc., 445 South St., Morristown, N.J. 07960 and are herein incorporated by reference. It will be appreciated, however, that any number of approaches may be used to communicate such heartbeat messages.

When the SCP determines that the service node has become unavailable, the SCP then sets a flag indicating that the service node is unavailable. In turn, whenever the SCP would otherwise direct a switch to connect a call to the service node, the SCP would note from the flag that the service node is unavailable. In this situation, the SCP responsively does not direct the switch to connect the call to the service node. Instead, the SCP directs the switch to take some alternative action with respect to the call, such as connecting the call directly through to the called party or blocking the call (e.g., providing a busy signal to the caller and/or a message that the call cannot be completed).

In the prepaid calling example discussed above, if the SCP has determined that the service node is unavailable, the SCP could direct the switch to connect a call through without charge to the prepaid subscriber. In this situation, the prepaid calling service provider would absorb the cost of such a call, particularly if it is the prepaid provider's service node that has become unavailable. Alternatively, the SCP could direct the switch to block the call and perhaps to play an announcement to the caller indicating that the prepaid subscriber cannot be reached.

As another example, for the custom ring-back tone service described above, if the SCP has determined that the service node is unavailable, the SCP could direct the switch to connect the call through to the called party. In this situation, the switch proceeds to connect the call to the called party, during which time the calling party would simply hear a conventional ring-back tone, rather than a custom ring-back tone.

For such embodiments, after determining that a service node is unavailable, the SCP may, at some point, determine that the service node has become available again (e.g., power has been restored or service has been performed on the service node). Once the SCP determines that the service node is available again, the SCP clears its flag indicating the previous unavailability of the service node, thus allowing the service node to be used once again for call processing and routing. The heartbeat messaging described above may be used by the SCP to determine that the service node has become available again. In this scenario, the SCP will start receiving heartbeat messages from the service node again, and the SCP then responsively clears the flag used to indicate that the service node was unavailable. Consequently, the next time the SCP determines that it should direct a switch to connect a call to the service node, the SCP would do so, and the service node would carry out its function in processing and setting up the call to the called party.

These and other aspects will become apparent to those of ordinary skill in the art by reading the following detailed description, with reference, where appropriate, to the accompanying drawings. Further, it should be understood that the embodiments noted in this summary are not intended to limit the scope of the invention as claimed.

BRIEF DESCRIPTION OF THE DRAWINGS

Embodiments of the present invention are described herein with reference to the drawings, in which:

FIG. 2 is a flowchart illustrating a method of eliminating an unavailable service node from a call path in accordance with an embodiment of the invention;

FIG. 3 is a flowchart illustrating another method of eliminating an unavailable service node from a call path in accordance with an embodiment of the invention;

DETAILED DESCRIPTION

Figure 1:
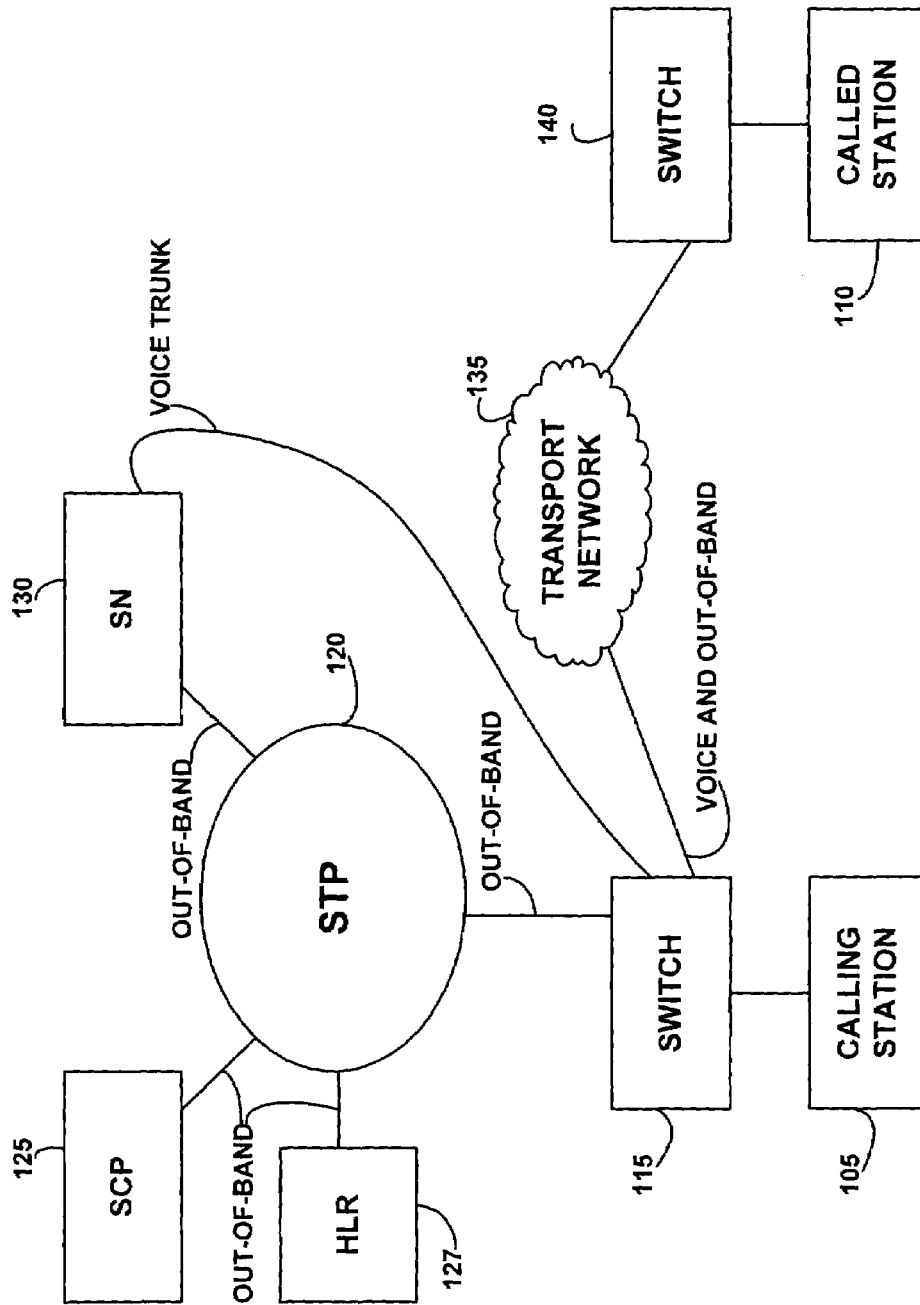
FIG. 1 is a block diagram illustrating a telecommunication system in accordance with an embodiment of the invention.

Telecommunication System Overview Referring to FIG. 1, a block diagram illustrating a telecommunication system 100 is shown in which an unavailable service node may be eliminated from a call path in order to avoid calling parties receiving erroneous busy signals or dead air. As in most telecommunications applications, it will be appreciated that many of the elements described herein are functional entities that may be implemented as hardware, firmware and/or software, and as discrete components or in conjunction with other components, in any suitable combination and location. Further, the system 100 may be a conventional wired plain-old-telephone service (POTS) system, a wireless communication system or a voice-over Internet Protocol (VoIP) system, among any number of other types of communication systems.

The system 100 includes a calling station 105, which may be a mobile phone, a POTS phone or a VoIP phone, as some examples. As discussed herein, it is assumed that when the calling station 105 places an outbound call to a called station 110 and that call is normally routed to the service node 130 for call processing and setup. As is known, placing a call from the calling station 105 to the called station 110 involves what is termed as in-band signaling and out-of-band signaling. The in-band signaling includes the voice portion of the call (typically carried via a voice trunk), while the out-of-band signaling includes various setup messages related to call processing and setup of the voice connection. The out-of-band signals may be carried, for example, over an Internet Protocol (IP) communication link.

The calling station 105 communicates with the switch 115 to request that its call be setup to the called station 110. In response to receiving the request to setup the call to the called station 110, the switch 115 communicates, via a signal transfer point (STP) 120, with a service control point (SCP) 125 to seek call processing guidance related to setting up the call. In turn, the SCP communicates (via the STP 120) with a home location register (HLR) 127 to access a service profile of the called station 110, which typically includes a list of one or more telecommunication services to which the called station 110 subscribes. The communication between the switch 115, the SCP 125 and the HLR 127 to set up the call is accomplished via out-of-band signaling (e.g., non-voice signaling over an IP connection), such as by using Signaling System 7 (SS7), as is known.

It will be appreciated that the HLR 127 may also be a visitor location register (VLR). Furthermore, the arrangement of the entities in the system 100 may be different. For example, the calling station 105 and called station 110 may be reversed or the called station 110 may be also be served by the switch 115 (coupled with the switch 115 in the same fashion as the calling station 105), among numerous other possible arrangements.

After communicating with the HLR 127, the SCP 125 may determine that the call from the calling station 105 to the called station 110 should first be routed to a service node 130 for additional call processing (e.g., prepaid calling and/or custom ring-back tone processing) prior to being set up to the called station 110. In this situation where the service node 130 is unavailable due to, for example, a power loss or malfunction, routing the call to the service node 130 may result in the calling station's 105 call being dropped or improperly handled (e.g., receiving a busy signal or dead air) rather than being routed to the called station 110.

In the system 100, such improper routing is avoided as a result of the SCP 125 monitoring the availability of the service node 130, such as through the use of heartbeat or keep-alive messages. If the SCP 125 does not receive one or more of the expected heartbeat messages from the service node 130, the SCP 125 then responsively determines that the service node 130 is unavailable. Various approaches for implementing such heartbeat messages may be employed, such as the use of push techniques or pull techniques over a Generic Data Interface (GDI) such as a Telcordia GDI, as was discussed above. For the system 100, the SCP 125 responsively determines that the service node 130 is unavailable based on the lack of receipt of a notification (e.g., periodic heartbeat or other message) from the service node 130, indicating it is available and functioning, regardless of the manner in which the service node 130 communicates such availability to the SCP 125.

In the situation where the SCP 125 has made a determination that the service node 130 is not available for call processing and set up, the SCP 125 responsively instructs the switch 115, using executable service logic, to handle the call from the calling station 105 to the called station 110 in a manner other than routing the call to the service node 130. In one embodiment, the SCP 125 instructs the switch 115 to set the call up "directly" to the called station 110, thus eliminating the unavailable service node from the call path. For the system 100, the call would be set up (over a voice trunk) to the called station 110 via a transport network 135 and a switch 140. The transport network 135 may be a public switched telephone network (a PSTN), a mobile telecommunications network or a packet-switched data network (such as for use with voice over Internet Protocol (VoIP) applications). It is noted that service logic for carrying out the various functions discussed herein may be implemented using software, hardware, firmware or any other suitable technique that is appropriate in a given implementation.

Methods for Eliminating an Unavailable Service Node from a Call Path

Referring now to FIG. 2, a flowchart illustrating a method for eliminating an unavailable service node from a call set up path is shown. The method shown in FIG. 2 is also described with further reference to the system 100 shown in FIG. 1. The method, at block 210, includes monitoring the availability of the service node 130. This monitoring may be accomplished using executable service logic that is implemented in the service node 130 and/or the SCP 125. For example, the service node 130 may include service logic to generate period heartbeat messages that are communicated to the SCP 125 via the STP 120. Such heartbeat messages may take the form of an SS7 message with a certain format, or may take any suitable form that may be recognized by the SCP 125. Such an approach may be termed a push technique (e.g. the heartbeat messages are autonomously "pushed" from the service node 130 to the SCP 125). In this situation, associated service logic in the SCP 125, when executed, recognizes these heartbeat messages when received at the SCP 125 as indicating the availability of the service node 130. Likewise, the service logic in the SCP 125 recognizes the cessation of the heartbeat messages as unavailability of the service node 130.

Alternatively, the SCP 125 may include service logic that, when executed, communicates periodic queries to the service node 130 (via the STP 120). The service node 130, in such a configuration, includes corresponding service logic that communicates responses to the queries to the SCP 125 when the service node is available and functioning as expected. The SCP 125 then treats these responses as heartbeat messages, which indicate the availability of the service node 130. Likewise, the SCP 125 treats the lack of a response from the service node 130 to a query as an indication that the service node is unavailable for call processing and set up.

If the service node 130 becomes unavailable (e.g., due to a power failure or loss of functionality), a determination of this unavailability is made at block 220. In this situation, the SCP 125 will make the determination that the service node 130 is unavailable as a result of the cessation of heartbeat messages (either pushed or pulled) from the service node 130. At block 230, as a result of making the determination that the service node 130 is not available for call processing and routing, a flag is set in the SCP 125 to indicate that the service node 130 is not currently available. The flag in the SCP 125 may be a software flag, a hardware flag, or any other suitable indicator implemented in the SCP 125.

At block 240, a request from the switch 115 seeking call processing guidance for a call from the calling station 105 to the called station 110 is received at the SCP 125. As noted above, the SCP 125 would normally instruct the switch 115 to route this call to the service node 130 for call processing and set up to the called station 110 (e.g., prepaid call processing or custom ring-back tone processing). However, at block 250, in view of the flag being set in the SCP 125 indicating that the service node 130 is unavailable, the SCP 125 responsively instructs the switch to handle the call in a manner other than routing the call to the service node 120.

Figure 4:
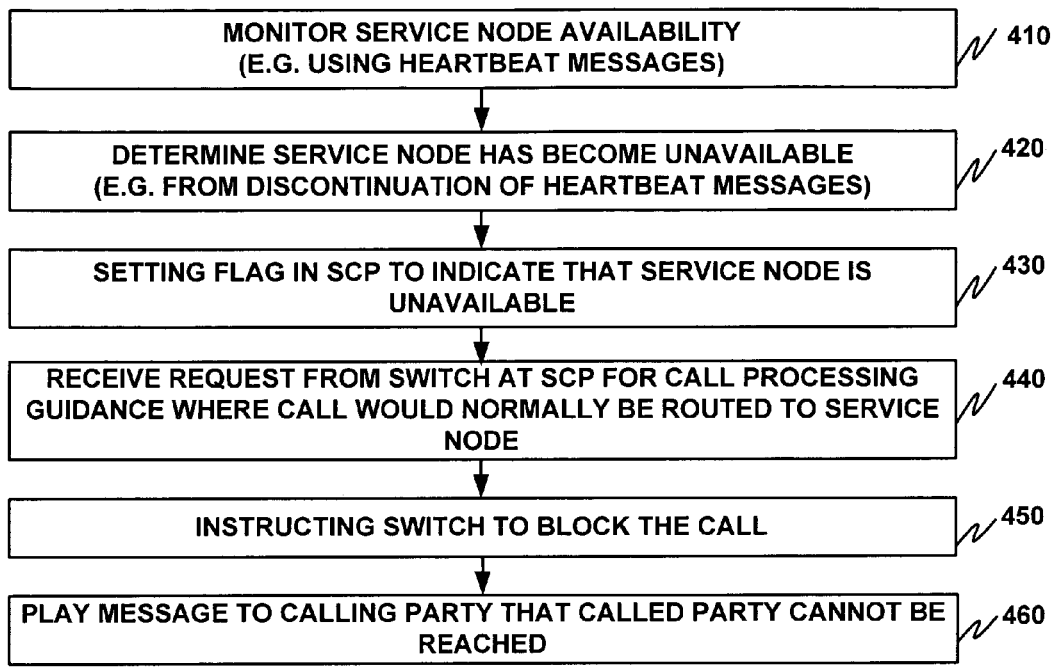
FIG. 4 is a flowchart illustrating yet another method of eliminating an unavailable service node from a call path in accordance with an embodiment of the invention.

Two examples of such an approach are shown, respectively, in the flowcharts of FIGS. 3 and 4. The methods shown in FIGS. 3 and 4 are substantially the same as the method of FIG. 2, with the exception that blocks 350 (in FIG. 3) and 450 (in FIG. 4) further define instructions that may be provided to the switch 115 by the SCP 125 as to how to handle the call from the calling station 105 to called station 110 when the service node 130 is unavailable.

Specifically, in block 350 of FIG. 3, the SCP 125 instructs the switch 115 to route the call to another location other than the unavailable service node 130. In this situation, the SCP 125 may direct the switch to route the call directly to the called station 110, or may direct the switch to route call to another location, such as a message server that may play a message to the calling station 105 that the calling station 110 cannot be reached. For the prepaid calling scenario discussed above, routing the call directly to the called station 110 would result in prepaid calling logic not being applied to the call. Therefore, the service provider of communication service may absorb the cost of the call in this situation. This may be a preferred approach, particularly if the unavailable service node 130 is the service provider's equipment. Likewise, for the custom ring-back tone service described above, routing the call directly to the called station 110 would result in the custom ring-back tone not being played to the calling station 105. In this situation, a conventional ring-back tone may be played back to the calling station 105 while the called station 110 is rung.

Alternatively, in block 450 the SCP 125 instructs the switch to block the call from the calling station 105 to the called station 110. At block 460, a message is played to the calling station 105 that the called station 110 is unavailable or cannot be reached. Such an approach may be used as an alternative to routing the call to another location other than to the unavailable service node 130, as described above with respect to FIG. 3. Alternatively, a conventional busy signal could be played to the calling station 105 when the service node 130 is unavailable, as opposed to a spoken message that the called station 110 is unavailable or cannot be reached.

Methods for Resuming Routing of Calls to a Previously Unavailable Service Node

Figure 5:
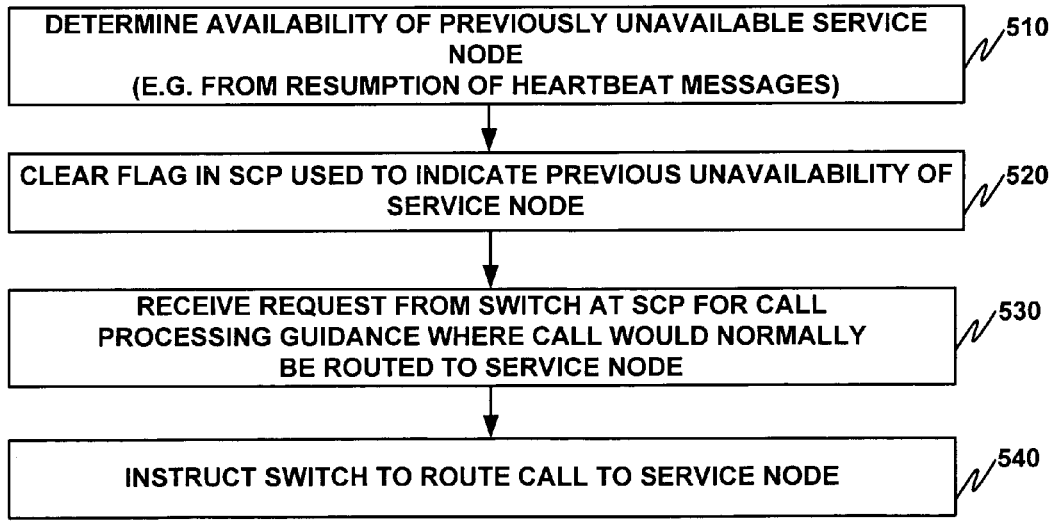
FIG. 5 is a flowchart illustrating a method of determining that a previously unavailable service node is now available and routing a call to the service node in accordance with an embodiment of the invention.

Referring now to FIG. 5, a method of resuming the routing of calls to a previously unavailable service node is shown. The method of FIG. 5, as with FIGS. 2–4, will be discussed with further reference to FIG. 1. The method of FIG. 5 includes, at block 510, determining that the service node 130 (previously unavailable) has become available again. This determination may be made as a result of the SCP 125 detecting the resumption heartbeat messages (e.g., pushed or pulled) from the service node 130. In response to the resumption of the heartbeat messages, at block 520, the SCP 125 clears the flag that indicated the previous unavailability of the service node 130.

The method further includes, at block 530, receiving into the SCP 125, a second request for call processing guidance for a second call to the called station 110 from the calling station 105. As was noted above, such a call would normally be routed to the service node 130. The method then includes, at block 540, the SCP 125 instructing the switch 115 to route the call to the service node 130 for call processing and set up (e.g., prepaid call processing) in view of the determination that the service node 130 has become available again.

CONCLUSION

Various embodiments of the present invention have been described herein. It will be appreciated, however, that those skilled in the art will understand that changes and modifications may be made to these arrangements without departing from the true scope and spirit of the present invention, which is defined by the following claims.

What is claimed is:

1. In a service control point (SCP) having logic normally dictating that a call destined to a called party should be routed to a service node for handling, a method comprising:
   making a determination that the service node has become unavailable;
   responsive to the determination that the service node has become unavailable, setting a flag indicating that the service node is unavailable;
   using the flag as a basis to determine that the service node is unavailable;
   after determining that the service node has become unavailable, (i) receiving into the SCP, a first signal from a switch indicating that the switch has received a request to set up a first call to the called party and (ii) in view of the determination that the service node has become unavailable, the SCP instructing the switch to treat the first call in a manner other than routing the call to the service node;
   making a determination that the service node has become available again;
   responsive to the determination that the service node has become available again, clearing the flag indicating that the service node is unavailable; and
   after determining that the service node has become available again, (i) receiving into the SCP, a second signal from the switch indicating that the switch has received a request to set up a second call to the called party and (ii) in view of the determination that the service node has become available again, the SCP instructing the switch to route the call to the service node.

2. The method of claim 1, wherein instructing the switch to treat the first call in a manner other than routing the first call to the service node comprises:
   instructing the switch to route the first call to a destination other than the service node.

3. The method of claim 2, wherein the destination is the called party.

4. The method of claim 1, wherein instructing the switch to treat the first call in a manner other than routing the first call to the service node comprises:
   instructing the switch to block the first call.

5. The method of claim 1, wherein making the determination that the service node has become unavailable comprises the SCP determining that the service node has become unavailable.

6. The method of claim 1, wherein making the determination that the service node has become unavailable comprises:
   detecting a discontinuation of heartbeat messages from the service node; and
   responsively determining that the service node is unavailable.

7. The method of claim 1, wherein the called party is a prepaid subscriber and the service node normally applies account-balance logic to the first call.

8. The method of claim 1, wherein the service node normally applies a custom ring-back tone service to the first call.

9. The method of claim 1, further comprising:
   in response to the determination that the service node has become unavailable, setting a flag indicating that the service node is unavailable, wherein setting the flag comprises setting the flag in the SCP; and
   using the flag as a basis to determine that the switch should treat the first call in the manner other than routing the first call to the service node.

10. In a communication system of the type comprising a switch, a service control point (SCP), and a service node, wherein (i) when the SCP receives a signal from the switch indicating that the switch has received a request to set up a call to a called party, the SCP responsively applies service logic that normally causes the SCP to instruct the switch to route the call to a service node rather than to the called party, and (ii) the service node then normally receives the call and sets up the call to the called party, a method comprising:
   before receiving the signal at the SCP, making a determination that the service node is unavailable; and
   due to the determination, the SCP instructing the switch to treat the call in a manner other than routing the call to the service node,
   wherein the service node normally applies, to the call, at least one of (i) account-balance logic when the called party is a prepaid subscriber and (ii) a custom ring-back tone service.

11. The method of claim 10, wherein instructing the switch to treat the call in a manner other than routing the call to the service node comprises:
   instructing the switch to route the call to a destination other than the service node.

12. The method of claim 11, wherein the destination is the called party.

13. The method of claim 10, wherein instructing the switch to treat the call in a manner other than routing the call to the service node comprises:
   instructing the switch to block the call.

14. The method of claim 10, wherein making the determination that the service node is unavailable comprises the SCP making the determination.

15. The method of claim 10, wherein making the determination that the service node is unavailable comprises:

detecting a discontinuation of heartbeat messages from the service node; and responsively determining that the service node is unavailable.

16. The method of claim 15, wherein the heartbeat messages are communicated between the SCP and the service node via a Generic Data Interface that is implemented over an Internet Protocol connection between the SCP and the service node.

17. In a service control point (SCP) having (i) a signaling interface that receives a signal from a switch indicating that the switch has received a request to set up a call to a called party and (ii) service logic that normally causes the SCP to responsively instruct the switch to route the call to a service node instead of to the called party, an improvement comprising:

first program logic executable, before receiving the signal from the switch, to (i) make a determination that the service node has become unavailable and (ii) set a flag in the SCP to indicate the unavailability of the service node, wherein the flag is used as a basis to determine that the service node is unavailable; and second program logic executable, in view of the determination, to instruct the switch to treat the call in a manner other than routing the call to the service node.

18. The improvement of claim 17, wherein the manner other than routing the call to the service node is routing the call to a destination other than the service node.

19. The improvement of claim 18, wherein the destination is the called party.

20. The improvement of claim 17, wherein the manner other than routing the call to the service node is blocking the call.

21. The improvement of claim 17, wherein the first program logic is executable to make the determination by detecting a discontinuation of heartbeat messages from the service node.

* * * * *